(12) United States Patent
    Tunzini

(10) Patent No.: US 12,669,091 B2
(45) Date of Patent: Jun. 30, 2026

(54) METHOD FOR THE PILOTED START-UP OF A GAS TURBINE OF AN AIRCRAFT, AND CORRESPONDING SYSTEM

(71) Applicant: SAFRAN POWER UNITS, Toulouse (FR)

(72) Inventor: Marc Daniel Tunzini, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 18/552,431

(22) PCT Filed: Mar. 30, 2022

(86) PCT No.: PCT/FR2022/050588
§ 371 (c)(1),
(2) Date: Sep. 25, 2023

(87) PCT Pub. No.: WO2022/208021
PCT Pub. Date: Oct. 6, 2022

(65) Prior Publication Data
US 2024/0175397 A1      May 30, 2024

(30) Foreign Application Priority Data
Mar. 30, 2021    (FR) ...................................... 2103276

(51) Int. Cl.
*F02C 7/268* (2006.01)
*F02C 7/275* (2006.01)

(52) U.S. Cl.
CPC .............. *F02C 7/268* (2013.01); *F02C 7/275* (2013.01); *F05D 2260/85* (2013.01)

(58) Field of Classification Search
CPC ........ F05D 2260/85; F02C 7/26; F02C 7/268; F02C 7/275
See application file for complete search history.

(56) References Cited

U.S. PATENT DOCUMENTS 8,823,334 B2    9/2014  Huang et al.
2005/0007044 A1*  1/2005  Qiu ...................... G05B 13/048
                                                318/717

(Continued)

FOREIGN PATENT DOCUMENTS

EP      1 553 275 A2    7/2005
EP      2 636 873 A2    9/2013

OTHER PUBLICATIONS

International Search Report mailed Jul. 27, 2022, issued in corresponding International Application No. PCT/FR2022/050588, filed Mar. 30, 2022, 7 pages.

(Continued)

*Primary Examiner* — Gerald L Sung
(74) *Attorney, Agent, or Firm* — CHRISTENSEN O'CONNOR JOHNSON KINDNESS PLLC

(57) ABSTRACT

A gas turbine of an aircraft includes start-up system configured to drive a shaft of the gas turbine in rotation. The start-up system includes a control system and a brushless asynchronous electric machine and is supplied with a DC voltage. A method for starting the gas turbine includes the steps of converting the DC voltage into a three-phase voltage control system based on a first value representative of a rotational speed of a rotor of the electric machine and on a second value representative of a ratio of a determined target torque of the electric machine, suitable for driving the rotation of a shaft of the gas turbine at a determined speed, to the maximum theoretical torque that the electric machine is able to produce at the determined rotational speed of the rotor.

10 Claims, 2 Drawing Sheets

(56)          References Cited

U.S. PATENT DOCUMENTS

| 2005/0184698 A1 * | 8/2005 | Anghel .................. H02P 9/007 |
| | | 318/715 |
| 2018/0051946 A1 * | 2/2018 | Stambaugh, Sr. ...... F02C 7/224 |
| 2018/0202315 A1 | 7/2018 | Coldwate |
| 2018/0223740 A1 * | 8/2018 | Forest .................... F02C 7/268 |
| 2018/0309397 A1 | 10/2018 | De Wergifosse |

OTHER PUBLICATIONS

Written Opinion mailed Jul. 27, 2022, issued in corresponding International Application No. PCT/FR2022/050588, filed Mar. 30, 2022, 6 pages.

* cited by examiner

301

303

305

307

309

METHOD FOR THE PILOTED START-UP OF A GAS TURBINE OF AN AIRCRAFT, AND CORRESPONDING SYSTEM

FIELD OF THE DISCLOSURE

The disclosure relates to the field of aircraft, and more specifically, to a method for starting a gas turbine of an aircraft. The disclosure also relates to a system for starting of a gas turbine of an aircraft using such a method.

BACKGROUND

The prior art comprises in particular the documents US-A1-2018/309397, US-B2-8 823 334, EP-A2-2 636 873, US-A1-2018/202315 and EP-B1-1 553 275.

Typically, in an aircraft, the Auxiliary Power Unit (APU) is started by a Direct Current (DC) starter motor which is mechanically connected to an Accessory GearBox (AGB) to which the APU is coupled.

In particular, the AGB comprises a gear train with a power take-off on the shaft of a gas turbine of the aircraft and power outputs, also referred to as drive lines, configured to drive in rotation the rotors of various items of equipment such as pumps or an electric generator. The starter is therefore connected to one of the drive lines of the AGB, typically in a disengageable manner, so as to drive the gear train of the AGB, and consequently the shaft of the turbine, when the gas turbine of the aircraft is started up.

As is well known, the fact that the starter is of the DC type means that the starting performance of the gas turbine is linked to a large number of highly variable external parameters. For example, it may depend on the characteristics of the gas turbine (which themselves depend on temperature, wear, etc.) and the characteristics of an electrical circuit to which the starter is connected (such as the state of load or the temperature of a battery in this circuit which powers the starter).

The sensitivity of the starter to external parameters can lead to ignition faults. This is particularly the case when the starting is too quick. In this case, once a flame is established in the combustion chamber of the turbine, it is immediately blown out by the compression stage of the turbine, which accelerates too quickly. This is also the case, conversely, when the start-up is too slow. In this case, once the combustion chamber has been ignited, the acceleration torque of the turbine, which results from both the combustion and the driving by the starter, may be too low, leading to an overheating of the combustion chamber, which in turn causes the start-up to be aborted.

Another problem with using a DC starter is that this type of starter generally involves significant costs, due to the maintenance required for the brushes of the electric machine used for the starter and/or the use of a sophisticated electronics to pilot the starter.

Recent alternative solutions involve having the starting function carried out by an electric generator connected to the AGB. A power electronic is then added to the existing electric generator to allow it to be used in engine mode and therefore as a starter. A Generator Control Unit (GCU) is used to pilot the operation of the generator and, in particular, to switch it from engine mode to generator mode depending on the desired application.

The starting function assigned to the generator implies that it has specific characteristics allowing it to generate a sufficient torque at the level of the interface shaft with the AGB to be able to start the gas turbine. In particular, the voltage used to pilot the electric machine must have specific characteristics to generate this torque in fine.

Typically, integrating the starting function into the generator means that the power electronics, interfaced to the generator, comprise a number of complex components dedicated to adapting a voltage generated by a starter battery (generally a DC voltage of 28 volts) to produce the mechanical power required for starting. So, depending on the cooling mode used and the environmental requirements it meets, this assembly of electronic components represents a high mass of around 25 to 30 kg. This solution is therefore essentially limited to configurations in which the power electronics used are shared with other requirements, such as starting the aircraft's main engines.

Furthermore, in this type of configuration, the use of a brushless electric machine to generate the torque required to start the gas turbine implies the use of potentially complex means to control the electric machine in an optimal manner to allow the gas turbine to be started.

SUMMARY

The present disclosure proposes a solution that at least partially allows to remedy the above-mentioned disadvantages.

To this end, according to a first aspect, the disclosure relates to a method for starting a gas turbine of an aircraft, a starting system being configured to drive a shaft of the gas turbine in rotation, the starting system comprising a control system and an electric machine of brushless asynchronous type and being powered with a DC voltage, the starting method comprising:

receiving, by the control system, a first value, representative of a speed of rotation of a rotor of the electric machine;

receiving, by the control system, a second value;

converting, by the control system, the DC voltage into a three-phase voltage system for controlling the electric machine; and, controlling, by the control system, the electric machine using the three-phase control voltage system, the starting method being characterized in that the second value is representative of a ratio of a determined target torque of the electric machine, adapted to drive the rotation of the rotor of the electric machine at a determined speed, to the theoretical maximum torque that the electric machine can produce at the determined speed of rotation of the rotor and in that during the modulation, the frequency and the amplitude of the voltages of the three-phase control voltage system are determined from a control law dependent on the second value.

The method according to the disclosure may comprise one or more of the following characteristics, taken alone or in combination with each other:

the control law determining the frequency and the amplitude of the voltages of the three-phase control voltage system is a scalar type control law.

the control law used to determine the amplitude Vs and the frequency $F_s$ of the voltages of the three-phase control voltage system is such that:

$$V_s = A + B*N \text{ and } F_s = C + D*N$$

where N is the rotational speed of the rotor of the electric machine and A, B, C and D are values dependent on the second value.

the second value is a value determined by a control unit of the gas turbine.

the first value is obtained from a measurement taken at the level of the rotor of the electric machine by an angular speed sensor.

The disclosure also relates, according to a second aspect, to a starting system for starting a gas turbine of an aircraft configured to drive in rotation a shaft of the gas turbine, the starting system comprising a control system and an electric machine of the brushless asynchronous type and being powered with a DC voltage, the control system comprising:

a receiving stage for receiving a first value, representative of a speed of rotation of a rotor of the electric machine, and a second value; and, a converting stage for converting the DC voltage into a three-phase voltage system for controlling the electric machine, the starting system being characterized in that the receiving stage is configured to receive the second value representative of a ratio of a determined target torque of the electric machine, adapted to drive the rotation of the rotor of the electric machine at a determined speed, to the theoretical maximum torque that the electric machine can produce at the determined speed of rotation of the rotor and the converting stage is configured so that, during the conversion, the frequency and the amplitude of the three-phase control voltage system are determined from a control law dependent on the second value.

The starting system according to the disclosure may comprise one or more of the following characteristics, taken in isolation from each other or in combination with each other:

the control system is an analogue electronic device.

Finally, according to a third aspect, the disclosure relates to an aircraft comprising a gas turbine and characterized in that it also comprises a starting system according to the second aspect.

DESCRIPTION OF THE DRAWINGS

The disclosure will be better understood and other details, characteristics and advantages of the present disclosure will become clearer from the following description made by way of non-limiting example and with reference to the attached drawings, in which.

The elements having the same functions in the different embodiments have the same references in the figures.

DETAILED DESCRIPTION

Figure 1:
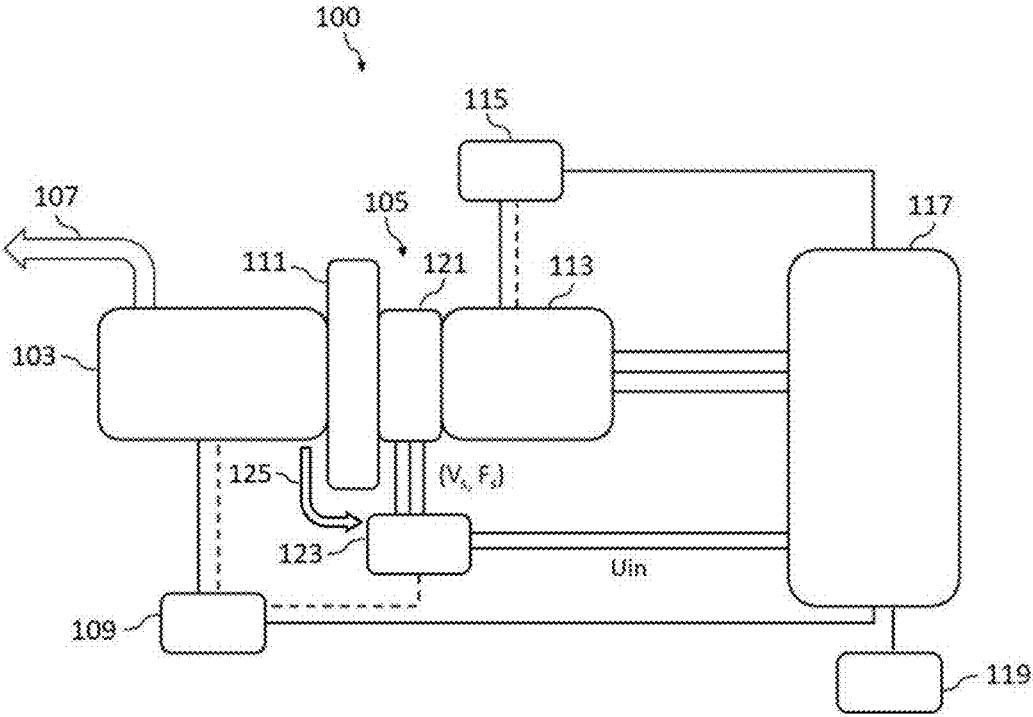
FIG. 1 is a schematic representation of an aircraft comprising a starting system for starting a gas turbine according to one embodiment of the disclosure.
Figure 2:
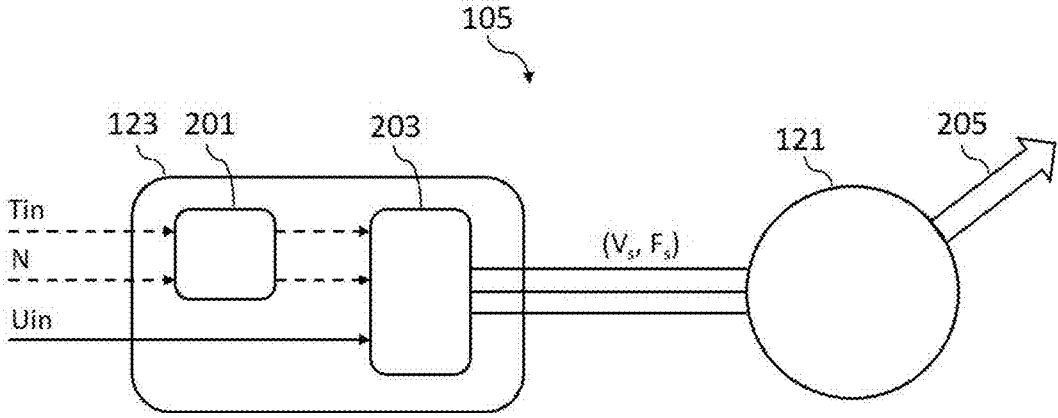
FIG. 2 is a schematic representation of a starting system according to one embodiment of the disclosure.

With reference to FIG. 1 and FIG. 2, we will now describe an embodiment of a starting system 105 for starting a gas turbine 103 of an aircraft 100 according to the disclosure. In these figures, the solid lines between the various blocks represent the transmission of an electric power, while the dotted lines represent the transmission of a control signal.

In the non-limiting example shown, the aircraft 100 comprises the following elements:

the gas turbine 103;

a collecting conduit 107;

an Engine Control Unit (ECU) 109;

an accessory gearbox 111;

an electric machine 121;

a control system 123;

a starting system 105 (comprising the electric machine 121 and the control system 123);

an electric generator 113;

an electric power distribution device 117;

a Generator Control Unit (GCU) 115; and, a battery 119.

In the example shown, the gas turbine 103 forms part of an auxiliary power unit (APU) of an aircraft. In addition, the gas turbine 103 comprises the collecting conduit 107 and is controlled by the Engine Control Unit 109 (ECU).

A shaft (not shown) of the gas turbine 103 is connected to the accessory gearbox 111, the drive lines of which are themselves connected, among others, to the electric generator 113.

In the embodiment shown, the electric generator 113 is configured to generate an AC voltage of 115 Volts to power electric items of equipment or systems of the aircraft 100. In addition, the electric generator 113 is controlled by the regulation unit 115 which is adapted to regulate the operation of the generator 113 so as to produce a given voltage from the mechanical energy derived from the torque produced by the shaft of the gas turbine 103.

The starting system 105 is configured to drive in rotation a shaft of the gas turbine 103 when it is started. In embodiments, the starting system has its own shaft (i.e., that of the rotor of the electric machine) which drives the motor shaft of the gas turbine by means of a gear train (which is, for example, included in the accessory gearbox). However, the disclosure also applies when the starting system is mounted directly on the drive shaft of the gas turbine ("direct drive" operation).

As mentioned above, the starting system 105 comprises the control system 123 and the electric machine 121. The latter converts electric power energy into mechanical energy used to drive the shaft of the gas turbine 103. In particular, the control system 123 controls the electric machine 121 to generate a drive torque used to start the gas turbine 103 if necessary. In addition, the electric machine 121 comprises a stator and a rotor configured to be driven in rotation relative to the stator and thus in turn drive the rotation of the shaft of the gas turbine 103 to which it is connected by means of the accessory gearbox 111.

The electric machine 121 is asynchronous. Advantageously, the use of this type of electric machine allows to reduce its degradation over time and, consequently, its maintenance requirements.

In addition, the advantages of the asynchronous technology are its manufacturing cost, the robustness of its rotor, the ease of implementing a scalar type control (as described in more detail below), the simplicity of using an angular speed sensor, the ease of assembly and its inert nature, which gives it a high level of safety with regard to the risk of electric shock or fire in the event of failure.

The electric machine 121 is controlled by a three-phase control voltage system, i.e., by three voltages of amplitude $V_s$ and frequency $F_s$ which are out of phase with each other.

More precisely, a DC voltage Uin (for example a DC voltage of 28 Volts) is delivered by the battery 119, then passes through the electric power distribution device 117, configured to receive and/or distribute the voltage from or to various items of equipment on the aircraft 100, before being transformed, by the control system 123, into a three-phase voltage system used to control the electric machine 121.

The electric power distribution device 117 also receives the AC voltage generated by the electric generator 113.

The person skilled in the art will appreciate that, in various embodiments, the control system 123 of the starting system 105 can be powered with a DC voltage from a battery, an on-board network, a park unit or a park socket.

FIG. 2 shows a more detailed embodiment of the starting system 105 and how it works.

The control system 123 of the starting system 105 comprises a stage 201 for receiving a first value N representative of a speed of rotation of the rotor of the electric machine 121 and a second value Tin (detailed below with reference to FIG. 3). The control system 123 also comprises a stage 203 for converting the DC power voltage Uin into a three-phase voltage system for controlling the electric machine 121. Each stage carries out the operations described above on a continuous basis.

In the example shown, the converting stage 203 is an inverter. This inverter is therefore used to generate, from Uin, N and Tin, the three-phase voltage system corresponding to three AC voltages whose amplitude Vs and frequency $F_s$ are equal but which are out of phase. In other words, the inverter is used to generate a balanced three-phase voltage.

In a particular embodiment, the control system 121, and in particular the converting stage 203, can be cooled with the fuel 125 consumed by the gas turbine.

In this case, if the aircraft to which the starting system is integrated comprises a valve for recirculating the surplus fuel flow rate, it can be positioned so as to allow the (fuel circulation) circuit to be looped over a heat sink of the converting stage 203. This means that if the inverter over-heats (for example, during successive aborted start-ups), this valve can be used between the successive starting phases so as to extract the heat and evacuate it via other components in the loop.

The electric machine 121 finally generates a specific torque as a function of the AC control voltages applied to its phases, which is symbolized by the arrow 205. The purpose of the method described below with reference to FIG. 3 is in particular to optimize the torque generated by the electric machine 121 of the starting system 105 at each instant.

Figure 3:
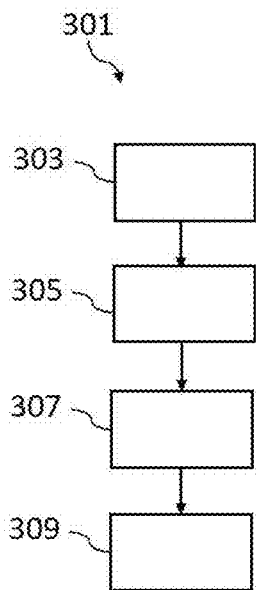
FIG. 3 is a step diagram of a method for starting a gas turbine of an aircraft according to one embodiment of the disclosure; and, FIG. 4 is an assembly of dynamic curves illustrating the regulation of the rotational speed of the rotor of the gas turbine and the regulation of the second value used to generate the control of the electric machine.

With reference to FIG. 3, we will now describe a method for starting a gas turbine of an aircraft according to one embodiment of the disclosure. The steps of the method described are implemented by a starting system such as that described with reference to FIG. 1 and FIG. 2.

The person skilled in the art will appreciate that, although the method is described in the form of a step diagram, the various steps can be executed in a different order and/or as continuous processes executed in parallel. In addition, the whole method executes continuously and therefore allows dynamic adjustment of the control of the electric machine of the starting system.

The starting method 301 firstly comprises a step 303 of receiving, by the control system 123, a first value N, representative of the speed of rotation of the rotor of the electric machine The starting method 301 also comprises a step 305 of receiving a second value Tin from the control system 123.

The starting method 301 also comprises a step 307 of converting the DC voltage Uin, powering the control system 123, into a three-phase voltage system (i.e., three AC voltages of equal amplitude and frequency but out of phase with each other) for controlling the electric machine 121, from the first value N and the second value Tin.

Finally, the starting method 301 comprises a step 309 of controlling the electric machine 121 from the control three-phase voltage system.

The second value Tin is a value representative of a ratio of a target torque allowing a given speed of rotation of the rotor of the electric machine to be reached to a theoretical maximum torque that the electric machine can produce at the given speed of rotation of the rotor (i.e., the speed of rotation N).

Typically, the torque ratio corresponding to the second value Tin is determined by an ECU, such as the control unit 109 shown in FIG. 1. This ECU transmits the second value Tin to the control system 123 of the starting system 105 and increases the torque ratio Tin according to a predetermined ramp until a level measurable by the ECU of the speed of the gas turbine (i.e., the speed of rotation of its shaft) is obtained.

The first value N is, for example, a value measured by an angular speed sensor at the level of the rotor of the electric machine 121 measuring this speed N in revolutions per minute, for example. The sensor transmits this speed information in real time to the control system 123.

During the converting step 307, the frequency $F_s$ and the amplitude $V_s$ of the voltages of the three-phase control voltage system are determined from a control law that depends on the second value Tin. In this way, the second value Tin regulates the torque control and allows the torque to be adjusted dynamically to obtain as quickly as possible the torque required to achieve a target speed profile for the rotation of the rotor of the electric machine.

In a particular embodiment, the control law that determines the frequency and the amplitude of the voltages of the three-phase control voltage system is a scalar-type control law.

The amplitude Vs and the frequency $F_s$ can be functions dependent on N and Tin according to a two-variable equation system.

In such a case, the scalar control law implies, for example, that the amplitude Vs of the control voltage as a function of the speed of rotation N of the rotor of the electric machine is written:

[Math 1]

$$Vs = A + B*N$$

In the same way, the frequency $F_s$ of the control voltage as a function of the speed rotation N of the rotor of the machine can be written as:

[Math 2]

$$Fs = C + D*N$$

A, B, C and D are values calculated from Tin using a formula of the type:

[Math 3]

$$A = E + F*Tin$$

The optimization of the starting method therefore involves the prior characterization of the electric machine in order to adapt these constants and allow that, ultimately, at each change in the second value Tin, the torque control transmitted to the electric machine 121 allows the target torque to be generated.

Advantageously, this type of control is simple and in particular allows the control system 123 of the starting system 105 to be, for example, an analogue electronic device.

Advantageously, the starting method 301 allows the starting torque produced by the starting system to be optimized in real time, using simple control and items of equipment that is lighter, cheaper and easier to maintain.

Figure 4:
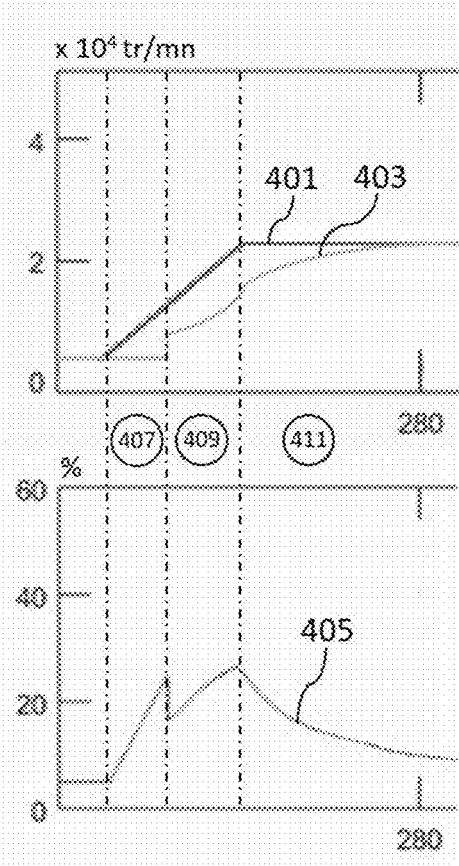

FIG. 4 shows dynamic curves illustrating the regulation of the rotational speed of the shaft of the gas turbine (proportional to the rotational speed of the rotor of the electric machine due to their connection via a gear train of an AGB) and the regulation of the second value used to generate the control of the electric machine.

The curve 401 represents a theoretical target rotational speed of the shaft of the gas turbine, the curve 403 represents an actual rotational speed (measured by a known method) obtained by applying the starting method described above and using the second value Tin represented by the curve 405 to regulate the speed.

In a first phase 407, the second value Tin follows a linear ramp so as not to cause a violent transient speed on the starting system and the gas turbine, which would risk causing damage both electrically (pilot electronics, asynchronous machine) and mechanically (via torques undergone by the asynchronous machine). The aim of this phase is to get the rotating assembly (rotor of the electric machine and shaft of the gas turbine) to start rotating.

The second phase 409 is the speed regulation input in which the ECU adjusts Tin to generate a linear acceleration.

The third phase 411 consists in obtaining a stabilization at a constant speed of rotation in order to obtain an optimum ignition condition for the combustion chamber of the gas turbine.

In addition, there is a fourth phase (not shown), similar to the second phase, whose function is to generate an acceleration ramp until a speed threshold is reached where the autonomy of the thermodynamic core of the aircraft is reached.

The invention claimed is:

1. A method for starting a gas turbine of an aircraft, a starting system being configured to drive a shaft of said gas turbine in rotation, said starting system comprising a control system and a brushless asynchronous electric machine and being powered by a DC voltage (Uin), said starting method comprising the steps of:

receiving, by the control system, a first value (N), representative of a speed of rotation of a rotor of the electric machine;

receiving, by the control system, a second value (Tin);

converting, by the control system, the DC voltage (Uin) into a three-phase voltage system for controlling the electric machine; and controlling, by the control system, the electric machine using the three-phase control voltage system, wherein, the second value (Tin) is representative of a ratio of a determined target torque of the electric machine, adapted to drive the rotation of the rotor of the electric machine at a determined speed, to the theoretical maximum torque that the electric machine can produce at the determined speed of rotation of the rotor, and during the conversion, a frequency (Fs) and an amplitude (Vs) of the voltages of the three-phase voltage system are determined according to a control law dependent on the second value (Tin), and wherein the control law determining the frequency (Fs) and the amplitude (Vs) of the voltages of the three-phase control voltage system is a scalar control law, and wherein the control law used to determine the amplitude (Vs) and the frequency (Fs) of the voltages of the three-phase control voltage system is such that:

$$Vs=A+B*N$$

and $$Fs=C+D*N$$

wherein A, B, C and D are values dependent on the second value (Tin).

2. The starting method according to claim 1, wherein the second value (Tin) is a value determined by a control unit of the gas turbine.

3. The starting method according to claim 1, wherein the first value (N) is derived from a measurement taken at a level of the rotor of the electric machine by an angular speed sensor.

4. A starting system for starting a gas turbine of an aircraft configured to drive a shaft of said gas turbine in rotation, said starting system comprising a control system and an electric machine of the brushless asynchronous type and being powered by a DC voltage (Uin), said control system comprising:

a converting stage configured to convert the DC voltage (Uin) into a three-phase voltage system that controls the electric machine according to a first value (N) and second value (Tin), wherein the second value (Tin) representative of a ratio of a determined target torque of the electric machine, adapted to drive the rotation of the rotor of the electric machine at a determined speed, to the theoretical maximum torque that the electric machine can produce at the determined speed (N) of rotation of the rotor, and the converting stage is configured so that, during the conversion, a frequency (Fs) and an amplitude (Vs) of the voltages of the three-phase control voltage system are determined from a control law dependent on the second value (Tin)

and wherein the control law determining the frequency (Fs) and the amplitude (Vs) of the voltages of the three-phase control voltage system is a scalar control law, and wherein the control law used to determine the amplitude (Vs) and the frequency (Fs) of the voltages of the three-phase control voltage system is such that:

$$Vs=A+B*N$$

and $$Fs=C+D*N$$

wherein A, B, C and D are values dependent on the second value (Tin).

5. The starting system of claim 4, wherein the control system is an analogue electronic device.

6. An aircraft comprising a gas turbine and a starting system according to claim 4.

7. An aircraft comprising a gas turbine and a starting system according to claim 5.

8. The starting system of claim 4, wherein the starting system has a shaft which drives the shaft of the gas turbine by means of a gear train.

9. The starting system of claim 4, wherein the starting system is mounted directly on the shaft of the gas turbine.

10. The starting system of claim 4, wherein the converting stage, is configured to be cooled with a fuel consumed by the gas turbine.

* * * * *